(12) United States Patent
Eby et al.

(10) Patent No.: US 11,790,749 B2
(45) Date of Patent: Oct. 17, 2023

(54) SYSTEMS AND METHODS FOR FORECASTING AND ASSESSING HAZARD-RESULTANT EFFECTS

(71) Applicant: 1st Street Foundation, Inc., Brooklyn, NY (US)

(72) Inventors: Matthew Eby, Brooklyn, NY (US); Edward Kearns, Fairview, NC (US); Michael Amodeo, Port Washington, NY (US); Jeremy Porter, North Babylon, NY (US); Neil Freeman, Brooklyn, NY (US); Steven McAlpine, Brooklyn, NY (US)

(73) Assignee: 1ST STREET FOUNDATION, INC., Brooklyn, NY (US)

( * ) Notice: Subject to any disclaimer, the term of this patent is extended or adjusted under 35 U.S.C. 154(b) by 0 days.

(21) Appl. No.: 17/455,431

(22) Filed: Nov. 18, 2021

(65) Prior Publication Data
US 2022/0415155 A1    Dec. 29, 2022

Related U.S. Application Data

(63) Continuation of application No. 17/361,290, filed on Jun. 28, 2021, now Pat. No. 11,200,788.

(51) Int. Cl.
*G08B 21/10* (2006.01)
*G08B 29/26* (2006.01)
(Continued)

(52) U.S. Cl.
CPC .............. *G08B 21/10* (2013.01); *G06N 7/01* (2023.01); *G06T 7/70* (2017.01); *G08B 29/26* (2013.01);
(Continued)

(58) Field of Classification Search
CPC . G02B 21/10; G06T 7/70; G06T 2207/20076; G06T 2207/30184; G06N 7/005; G08B 29/26
(Continued)

(56) References Cited

U.S. PATENT DOCUMENTS

| | | | |
|---|---|---|---|
| 2013/0197807 A1* | 8/2013 | Du | G06Q 40/08 702/5 |
| 2018/0173814 A1 | 6/2018 | Soman et al. | |

(Continued)

*Primary Examiner* — Hai Tao Sun
(74) *Attorney, Agent, or Firm* — Flaster Greenberg, P.C.

(57) ABSTRACT

Hazard-resultant effects to land and buildings are predicted based on various inputs. Hazards may include any appropriate type of hazard (e.g., flood, wildfire, climate-related hazards, or the like). Inputs may include the likelihood that that a specific type of hazard may occur for various scenarios, terrestrial boundaries, property boundaries, census geographies, or the like. Relationships between the inputs are determined and used to quantify parameters pertaining to a specific type of hazard. For example, the depth of flood water may be predicted for a particular terrestrial boundary, a city or town, or a building, for specific climate scenarios. A risk likelihood of the quantified parameter may be determined for a particular period of time and environment. For example, flooding to a building may be determined, broken down by depth threshold and year of annual risk for specific climate scenarios. Economic loss also may be predicted.

30 Claims, 10 Drawing Sheets

(51) Int. Cl.
  *G06T 7/70*    (2017.01)
  *G06N 7/01*    (2023.01)
(52) U.S. Cl.
  CPC ............... *G06T 2207/20076* (2013.01); *G06T 2207/30184* (2013.01)
(58) Field of Classification Search
  USPC ........................................................ 340/690
  See application file for complete search history.

(56)   References Cited

U.S. PATENT DOCUMENTS

2019/0034820 A1* 1/2019 Manning ................ G06Q 50/26
2020/0155881 A1* 5/2020 Tohidi ................... G06T 3/4046
2021/0302603 A1* 9/2021 Liu ......................... G06N 3/04

* cited by examiner

| Annual Probability | Cumulative Probabilities | | |
| --- | --- | --- | --- |
| | Over 5 years | Over 15 years | Over 30 years |
| 50% (1/2) | 97% | 100% | 100% |
| 20% (1/5) | 67% | 97% | 100% |
| 10% (1/10) | 41% | 79% | 96% |
| 1% (1/100) | 5% | 14% | 26% |
| 0.2% (1/500) | 1% | 3% | 6% |

FIG. 6

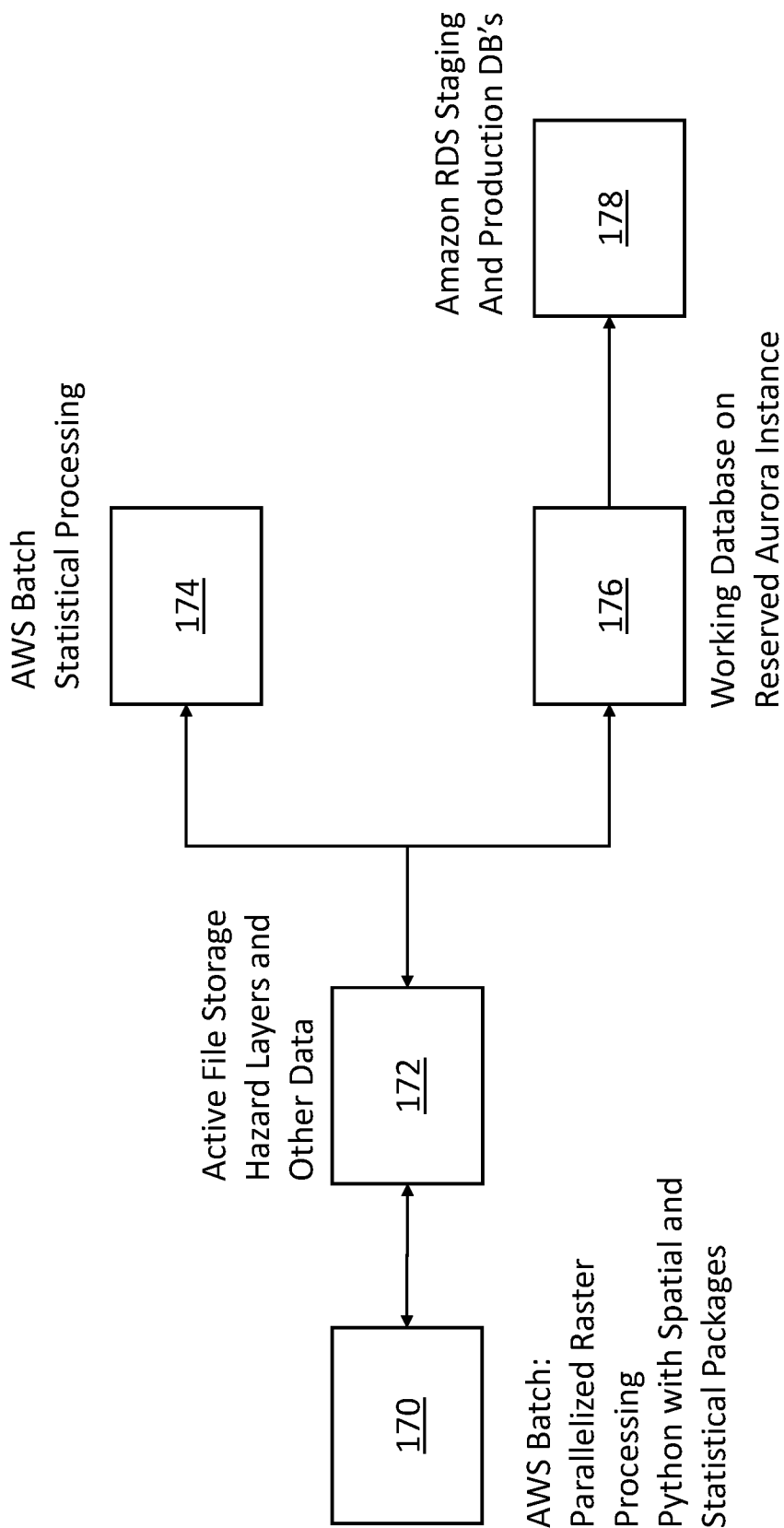

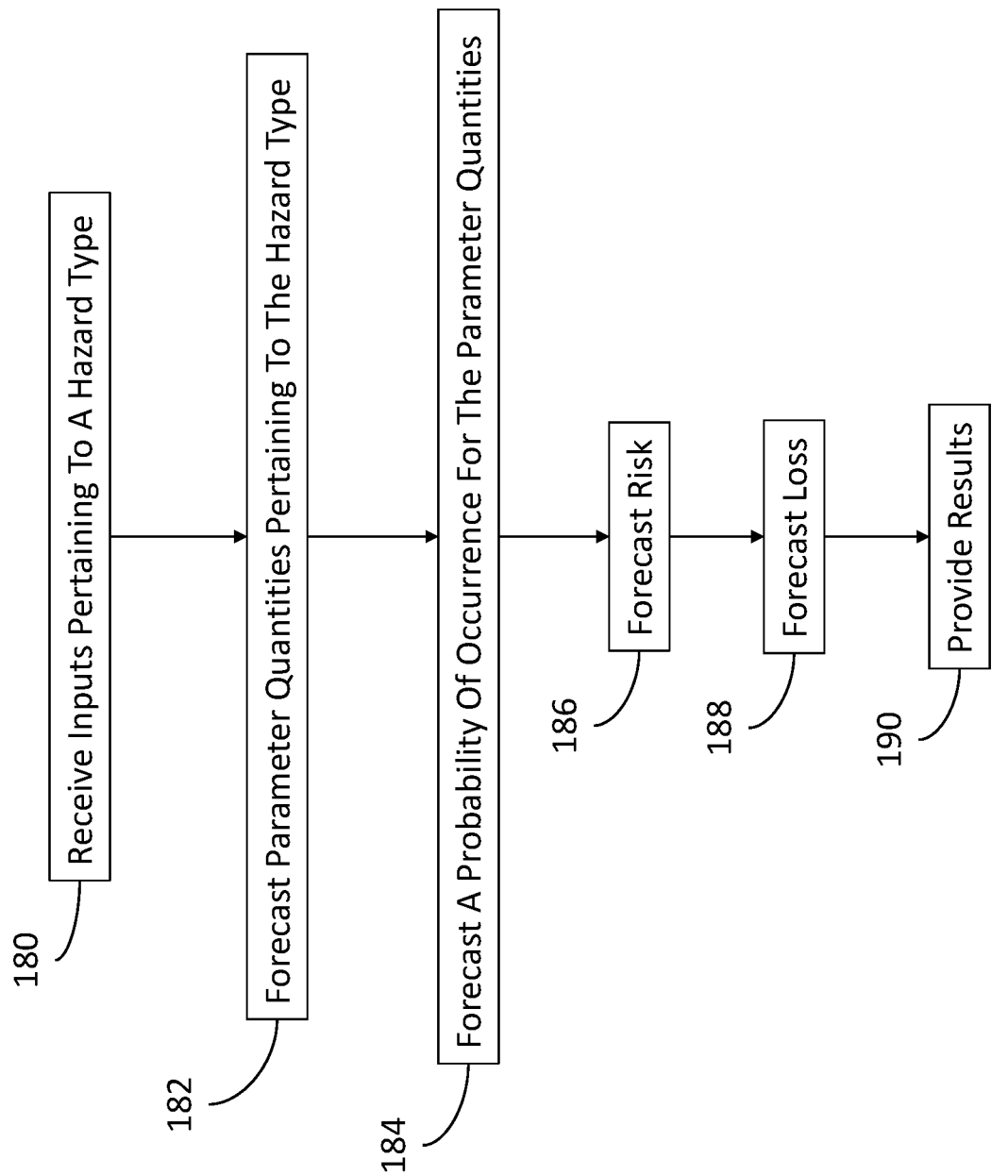

SYSTEMS AND METHODS FOR FORECASTING AND ASSESSING HAZARD-RESULTANT EFFECTS

CROSS-REFERENCE TO RELATED APPLICATION

This application is a continuation of U.S. patent application Ser. No. 17/361,290, filed Jun. 28, 2021, the disclosure of which is incorporated herein by reference in its entirety.

FIELD OF THE INVENTION

The present invention generally relates to systems and methods for forecasting and assessing hazard-resultant effects on terrestrial boundaries, political boundaries, municipal boundaries, properties boundaries, and/or building boundaries (footprints).

BACKGROUND

Various type of hazards, such as floods, fire, storms, or the like, are known to cause damage and financial loss. The impact can be quite severe for municipalities and individuals. For example, major flood damage to a coastal city could cost the city hundreds of millions of dollars to repair. Individuals, too, could lose personal property, such as a home, buildings, and land (e.g., farm land, etc.). Additionally, wildfires have been responsible for the loss of homes, land, and buildings. Wildfire hazards may result from the ignition of vegetative fuels, which can grow and spread when subject to so-called "fire weather" conditions of low humidity and high winds. Climate change impacts both the quantity and condition of those available fuels indirectly through change in vegetation composition, and directly through changes in the frequency and severity of fire weather conditions. When real estate and homes are impacted by wildfire hazards, the property and building are typically totally destroyed, though partial damage is sometimes realized. Existing systems that provide information about hazards do not provide, among other things, information at a fine enough resolution to allow for an accurate association between the hazard and a particular property. Thus, a person could move into a neighborhood not knowing it is prone to such hazards today, and when subject to a changing climate in the future.

SUMMARY

Systems and methods described herein forecast and assess hazard-resultant effects. Hazards may include, but are not limited to, flood, fire/wildfire (smoke, air quality), heat (air quality), drought, connective storms (e.g., tornado, hail), severe thunderstorms, mudslides landslides, climate-related hazards, or the like. The systems and methods for forecasting and assessing hazard-resultant effects, in contrast to existing systems which provide only generic hazard related information, provide hazard-related information at a fine enough resolution to allow for extremely accurate association of the hazard-related information to specific locations (e.g., land, regions, municipalities, cites, buildings, specific addresses, etc.) as a function of time (e.g., current date, select date, one year in the future, five years in the future, thirty years in the future, select years, cumulative years, etc.). As described herein, assessor property data, including building footprints, may be associated with specific hazard severity values to determine various property-specific data and property-specific statistics related to the effects of the hazard on the property. In an example embodiment, all property records and building footprints in the country are stored in a database and utilized by a workflow to parallelize the computation of severity and other data and statistics regarding hazard-related effects on a specific location. This information may be provided from the database in real time. The systems and method also may utilize statistical data imputation methods to supplement existing data with a best estimate of building characteristics to forecast and estimate financial loss. Accordingly, hazard-related financial loss from structural damage for every property in the country may be estimated and forecast.

Systems and methods for forecasting and assessing hazard-resultant effects, described herein, may provide the risk of flooding, for example, at any location (e.g., in the contiguous 48 states) due to rainfall (pluvial), riverine flooding (fluvial), coastal surge flooding, or the like. The resolution at which risk values are provided may be adjusted. For example, risk values may be provided across the US at a 3-meter or finer horizontal resolution. Risk values may be provided for areas that have no previous hazard modeling. For example, flood risk values may be provided for areas that have no flood modeling, including areas having no recorded hydrologic data. The system may take changing environmental factors into account by applying global climate model projections to forecast how hazard (e.g., flood, fire) risk will change over the upcoming years (e.g., 30 years). The system may consider a location's risk of flooding based on high intensity rainfall, overflowing rivers and streams, high tides, and coastal storm surge, or the like. The system may consider a location's risk of lire damage based on predicted climate change and weather conditions. Different hazard types may be analyzed independently, then coupled together to create a unified hazard risk model. For example, different flood types may be analyzed independently, and coupled together to create a unified flood risk model. Different flood types may be analyzed independently, and coupled together to create a unified fire risk model.

The system may show the risk of fire at any location in the country due to wildfire or the like. The impact of wildfire on the building can be caused by direct ignition from the flames adjacent to the building, or by flying embers landing on the building or being swept inside roof vents or windows. The vulnerability of buildings to wildfire damage may be assessed by considering the materials used in their construction, including roof type, window configuration, roof vent composition, landscape gradient, the presence of vegetation within a certain distance of the building itself, or the like.

In an example embodiment, the system may consider various uncertainties and provide a distribution of likelihoods of a hazard occurring within a time period. For example, the system may consider various uncertainties and provide a distribution of likelihoods of a flood occurring within a given year. Based on a location's history and geographic information (such as elevation, climate, proximity to water, and adaptation measures, or the like), the system may create a range of probabilities, for a given return period, A return period is the estimated time interval between similar events. For example, if a hazard of a particular intensity, such as a flood, is expected to occur once every 100 years, the return period is 100 years. The system may analyze select probabilities to create hazard layers, which show where and the extent to which a hazard could occur for each probability. For example, the system may analyze select annual probabilities (e.g., 0.2%, 1%, 10%, 20%, 50%)

to create hazard layers, which show where and how deep flooding could occur for each probability. This allows for mapping of hazard risks for different probabilities within a given time period.

The system may account for environmental changes that impact flood risks, such as sea level rise and precipitation patterns. Based on various environmental scenarios, carbon emission scenarios, and the like, the system may generate high, median, and low environmental scenarios that may be used to calculate current and future flood risks to show how flood risks will change as a function of time (e.g., in future years).

Based on the determined flood depth for any probability, the system may determine the likelihood of a flood reaching a minimum depth in a given year (referred to as an annual flood likelihood. The system also may determine a cumulative flood likelihood, which shows the likelihood of flooding to a certain depth at least once as a function of time, such as, for example, over a given time period (e.g., 15 or 30 years).

The system may provide the ability overlay various hazard-related data on a map. For example, the system may facilitate the visualization of flood risk by layering flood tiles on a map. Tile layers may be placed over a map at multiple zoom levels. The system may generate a map that represents flood inundation with multiple depth thresholds for a specified return period as a function of time.

BRIEF DESCRIPTION OF THE DRAWINGS

The instant disclosure will be more fully understood with reference to the following detailed description when taken in conjunction with the accompanying figures.

FIG. 6 depicts cumulative probabilities of flooding in 5-year increments.

FIG. 9 is a functional block diagram of a specific example implementation of a system forecasting and assessing hazard-resultant effects.

FIG. 10 is a flow diagram for an example method for forecasting and assessing hazard-resultant effects.

DETAILED DESCRIPTION

For purposes of the present detailed description, unless otherwise stated, the singular shall include the plural and the plural shall include the singular. Further, when a list is provided, regardless of the conjunction used, the list shall be interpreted to include any combination thereof. For example, the list flood, fire, wind, or ice, shall be interpreted to mean flood, fire, wind, ice, or any combination thereof. Similarly, the list flood, fire, wind, and ice, shall be interpreted to mean flood, fire, wind, ice, or any combination thereof. Also, throughout this description, flooding is used as an example embodiment of a hazard. It is to be understood that the systems and methods described herein are applicable to any appropriate type of hazard, including, but not limited to flood, fire/wildfire (smoke, air quality), heat (air quality), drought, connective storms (e.g., tornado, hail), severe thunderstorms, mudslides landslides, climate-related hazards, or the like.

Described herein are systems and method for forecasting and assessing hazard-resultant effects (e.g., via a probalistic hazard model) that considers uncertainties and provides a distribution of likelihoods. For example, the likelihood of a hazard (flood, fire, wildfire, smoke, air quality, heat, drought, connective storms (e.g., tornado, hail), severe thunderstorms, mudslides landslides, climate-related hazards, etc.) occurring within a given year may be predicted based on a location's history and geographic information, such as elevation, climate, proximity to water, and adaptation measures. The likelihood of a hazard occurring may be determined for a range of probabilities.

Figure 1:
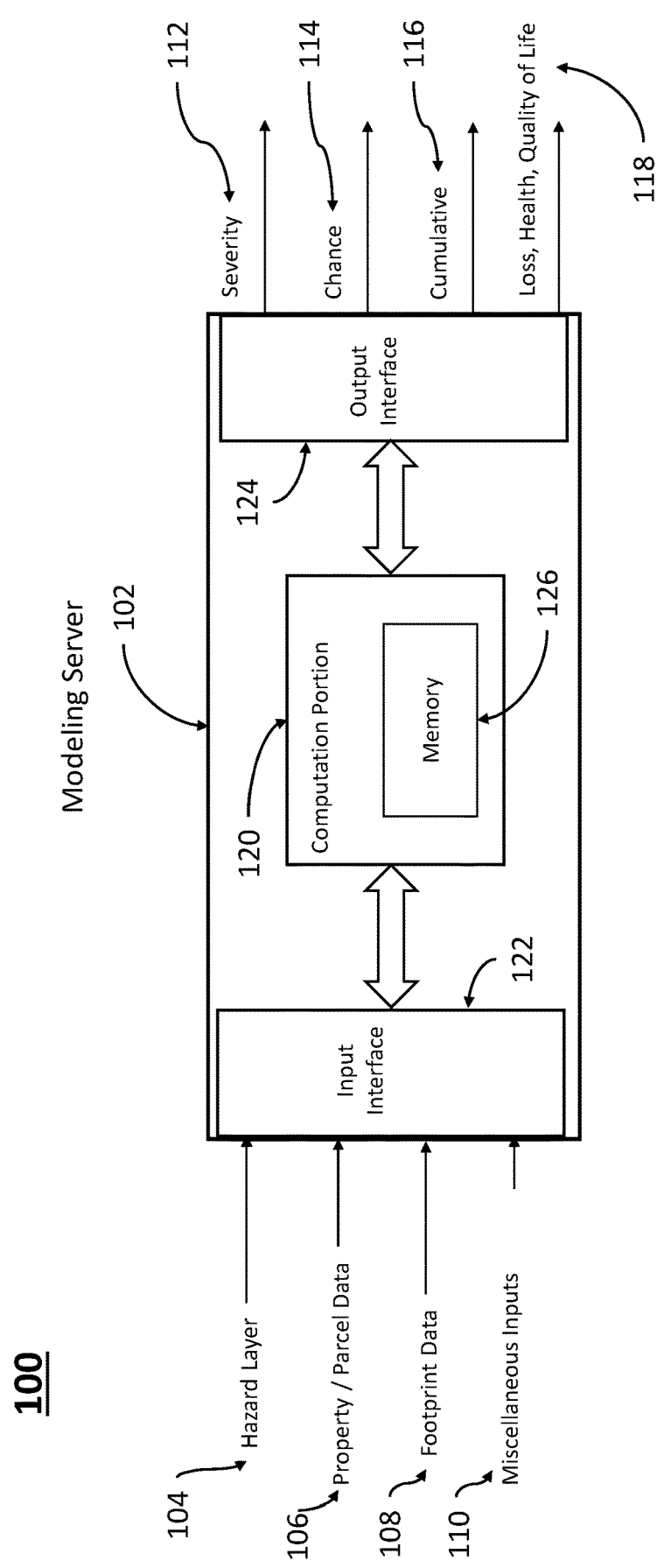
FIG. 1 is a block diagram of an example system for forecasting and assessing hazard-resultant effects.

FIG. 1 depicts an example system 100 for implementing a probabilistic hazard model that considers uncertainties and provides a distribution of likelihoods for a given hazard at a particular location. In an example embodiment, system 100 comprises modeling server 102, various inputs thereto 104, 106, 108, 110, and various outputs therefrom 112, 114, 116, 118. Modeling server 102 may comprise input interface 122 configured to receive various inputs 104, 106, 108, 110, output interface 124 configured to provide various outputs 112, 114, 116, 118, computation portion 120, and memory 126.

Input interface 122 of server 102 may receive various inputs, such as, for example, hazard layer 104, property and parcel data 106, building footprint data 108, and miscellaneous inputs 110. In an example embodiment, miscellaneous inputs 110 may include census geographies.

Hazard layer 104 may include multiple layers pertaining to a hazard, such as flood, fire, etc. Flood hazard layers may be the result of various hydrodynamic flood models, or the like. For example, flood hazard layers may be in the form of raster representations of the annual likelihood of a certain type of flooding in a specific combination of year and climate scenario. The raster representation of a hazard layer for a hazard (e.g., flood) may give a snapshot in time and in space for a given area of the likelihood of the hazard (e.g., flood) based on the force and conditions (e.g., weather conditions) indicated in weather data for the given time and space.

Each raster representation may include pixels with each pixel having a value that is an integer indicating a relative likelihood of the occurrence of the hazard. Hazard layer 104 may include any appropriate number of flood hazard layers which may be received by input interface 122. Fire hazard layers may be in the form of raster representations of the annual likelihood of a wildfire in a specific combination of year and climate scenario. Hazard layer 104 may include any appropriate number of fire hazard layers which may be received by input interface 122.

Computation portion 120 may encode received flood hazard layers with a depth of flooding (e.g., metric or standard, centimeters, inches, feet, fathoms, etc.). For example, each flood hazard layer of hazard layers 104 may be encoded with the depth and extent of flooding in a scenario such as a 1% annual flood event in the year 2020, under median climate conditions. Various other parameters may be received by input interface 122 and utilized by computation portion 120, such as elevation data, stream gauge readings, tide gauge readings, rainfall intensity data, or the like. Similar to flood hazards, the system may predict and assess hazard-resultant effects for hazards such as, for example, flood, fire/wildfire (smoke, air quality), heat (air quality), drought, connective storms (e.g., tornado, hail), severe thunderstorms, mudslides landslides, climate-related hazards, or the like.

Property and parcel data 106 may include various types of terrestrial and property boundaries. For example, property and parcel data 106 may include survey meets and bounds of a representation of terrestrial boundaries, personal property boundaries, addresses, building characteristics, sales records, or the like. The property and parcel data 106 may include parcels in vector format describing lines of boundaries (e.g., in a vector polygon) that may be overlaid or compared by the computation portion to pixels of values extracted from the hazard layers for the given parcel.

Building footprint data 108 may include outlines of buildings within the property data 106. The outlines may be obtained from any appropriate source, for example, satellite imagery, maps, or the like.

When there is no building footprint data 108 for a parcel defined by the property data 106, the hazard layer values at the center of the polygon (e.g., centroid or center point or predefined center points) within polygon may be used by the computation portion 120 to forecast the probability of occurrence for the given parcel defined by the property and parcel data 106. The center of a property is more indicative of the more interested portions of the property for evaluation. When the property and parcel data 106 includes footprint data 108 that defines a property within the parcel or property, whether in the center or located in another portion of the property (e.g., indicated by the polygon), the computation portion 120 may use a maximum value indicated by the hazard layer in the footprint that indicates the property. For example, the maximum depth of water in a flood may be taken from the hazard values within the footprint within the property or parcel.

Census geographies, included in miscellaneous inputs 110, may include census data for a given terrestrial boundary, municipal boundary, building, or the like. The miscellaneous inputs may also, or alternatively, include a period of time for which a user may want to see the likelihood of risk of a hazard, a given hazard, and/or a given property value.

The computation portion 120 may identify the hazard values for a given parcel over a period of time to identify the various outputs therefrom. The outputs may include severity data 112, chance data 114, cumulative data 116, and or other output data 118. The computational portion 120 of the system may provide severity data 112. Severity data 112 may include the flood depth for flooding to a property, terrestrial boundary, municipal boundary, or the like, broken down by return period as a function of time, e.g., year, as described above. Severity data 112 may include values for each of various (e.g., low, mid, and high) climate scenarios that are based on the values indicated in the hazard layers for the property over the defined period of time. The system may provide chance data 114 that includes the risk likelihood (e.g., percent probability) for the occurrence of the hazard at the property (e.g., chance of flooding to a property, terrestrial boundary, municipal boundary, or the like) when looking at the hazard data for the property over the period of time. The chance of occurrence of a flood may be broken down by depth threshold and year of annual risk as described herein. Chance data 114 may include values for each of the low, mid, and high climate scenarios.

The system may provide cumulative data 116. Cumulative data 116 may include the risk likelihood (e.g., percent probability) for the hazard (e.g., flooding) to a property, terrestrial boundary, municipal boundary, or the like over the period of time. The system may determine the cumulative risk of damage from a hazard based on the chance of occurrence indicated in the chance data 114 and the severity indicated in the severity data 112. The cumulative risk of flood may be broken down by depth threshold and cumulative year as described herein. Cumulative data 116 may include values for each of the low, mid, and high climate scenarios.

The system may provide other output data 118. Output data 118 may include data pertaining to loss, health quality of life, or the like. For example, output data 118 may include the Average Annual Loss (AAL) due to modeled hazard (flood, fire, wind, smoke, air quality heat, drought, convective storm, e.g., tornado, hail, severe thunderstorms, mudslide, landslide) risk for a location as described above. Output data 118 may include the impact on health due to modeled hazard risk for a location. Output data 118 may include the impact on a quality of life due to modeled hazard risk for a location.

The system may provide a mapping of hazard-related data to physical boundaries. The system may map forecasted flood depths to a map of a nation, a municipality, a terrestrial boundary, a building, or the like. The system may map damage and loss values as a result of flooding to a map of a nation, a municipality, a terrestrial boundary, a building, or the like. For example, the system may map the risk of flooding at any location in the contiguous 48 states due to rainfall (pluvial), riverine flooding (fluvial), or coastal surge flooding. The system may provide a mapping of forecasted hazard-related data over various time periods. For example, the system may provide a map showing how forecasted flood risk may change over a period of time (e.g., 30 years). The system may map flood-related data by return period.

To generate a map, the geospatial intersection of a general hazard layer with a terrestrial or property boundary may be used to assign risk to the terrestrial or property boundary. For example, the geospatial intersection of a general hazard layer with property and building locations may be used to assign risk to the property and buildings on that property. Hazards may be represented on a raster image, as described herein. Hazards may be represented at various resolutions. Hazards may be represented on a high-resolution grid of about 0.5-1 meters. Hazards may be presented by a course-resolution grid of about 3 meters. The course-resolution grid may be obtained from the high-resolution grid by downscaling the higher resolution hazard data using other environmental information to inform that downscaling (e.g., higher resolution topography at 1-3 m, vegetation images from aerial surveys at 0.5-1 m resolution).

Pixels within a boundary may be represented as a polygon. All pixels within a property's boundaries, may be represented as a polygon based upon parcel information. This information may be utilized to determine a risk factor for that parcel. If no buildings are present on the property, for example, the severity/magnitude of the gridded hazard closest to the centroid of the property may be used to assign the risk factor for that parcel. If a single building is on the property, for example, the maximum severity/magnitude of the gridded hazard within that building's footprint may be used to assign the risk factor for that parcel. If multiple buildings exist on the property, for example, the maximum severity/magnitude of the gridded hazard within the largest buildings footprint on the property may be used to assign the risk factor for that parcel. Statistics for each property may be computed from the gridded images of hazards, thereby reducing the problem from a two-dimensional (2D) geospatial hazard assessment to a one-dimensional (1D) vector statistical hazard assessment.

Figure 2:
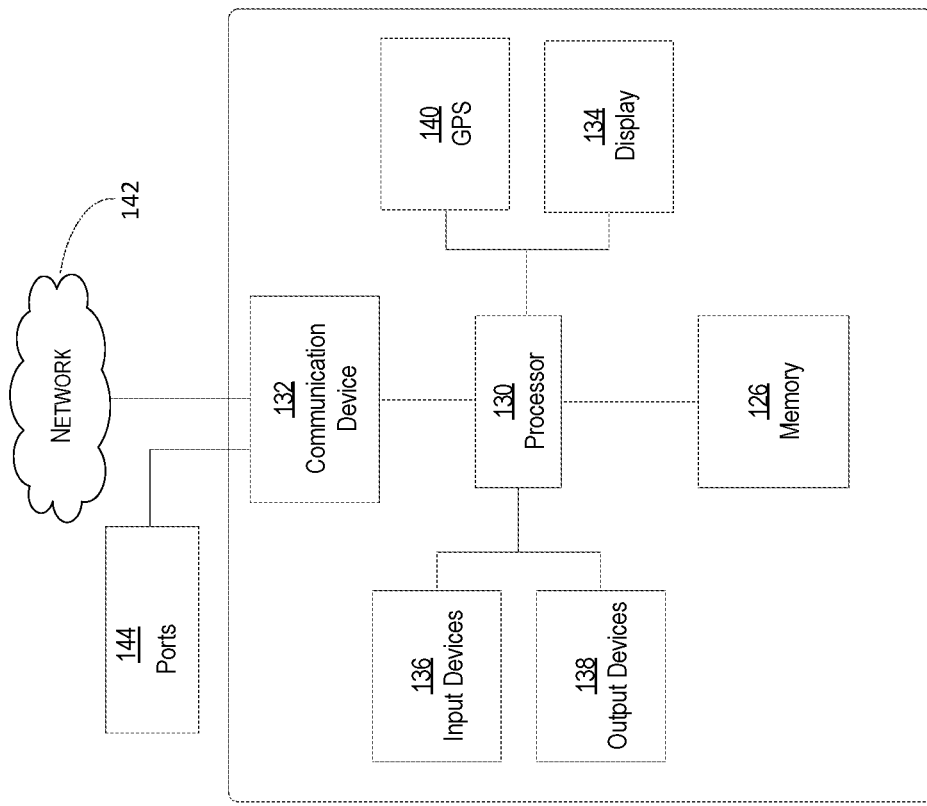
FIG. 2 is a block diagram of an example modeling server.

FIG. 2 illustrates a block diagram of an example modeling server 102. Server 102 may include a personal computer, such as a laptop or desktop computer, a tablet device, a cellular phone or smartphone, a server, or another type of computing device. Server 102 may include a processor 130 (corresponding to computation portion 120 in FIG. 1), communication interface 132 (working in conjunction with input interface 122 and output interface 124 in FIG. 1), memory 126, display 134, input devices 136, output devices 138, and GPS circuit 140. Server 102 may include additional, different, or fewer components.

Processor 130 may include one or more general purpose processors, special purpose processors, conventional processors, digital signal processors (DSPs), microprocessors, integrated circuits, a programmable logic device (PLD), application specific integrated circuits (ASICs), or the like. Processor 130 may perform signal coding, data processing, image processing, power control, input/output processing, and/or any other functionality that enables the server 102 to perform as described herein.

Processor 130 may store information in and/or retrieve information from memory 126. Memory 126 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. Memory 126 may be local memory or remote memory external to the server 102. Memory 126 may comprise distributed memory. Memory 126 may store instructions which are executable by the processor 130. Different information may be stored in different locations in memory 126.

Processor 130 may communicate with other devices via communication device 132. Communication device 132 may transmit and/or receive information over network 142 and/or ports 144 (e.g., USB, ethernet, hardwire, etc.), which may include one or more other computing devices. Communication device 132 may perform wireless and/or wired communications. Communication device 132 may include a receiver, transmitter, transceiver, driver, or other device capable of performing wired communications via a port and wireless communications via an antenna. Communication device 132 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. Server 102 may include one or more communication devices 132. In an example embodiment, communication device 132 includes input interface 122 and output interface 124 in FIG. 1.

Processor 130 may be in communication with display 134 for providing information to a user. The information may be provided via a user interface on display 134. The information may be provided as an image generated on display 134. Display 134 and processor 130 may be in two-way communication, as display 134 may include a touch-screen device capable of receiving information from a user and providing such information to processor 130.

Processor 130 may be in communication with GPS circuit 140 for receiving geospatial information. Processor 130 may be capable of determining the GPS coordinates of the wireless communication device 132 based on the geospatial information received from GPS circuit 140. The geospatial information may be communicated to one or more other communication devices to identify the location of the server 102.

Processor 130 may be in communication with input devices 136 and/or output devices 138. Input devices 136 may include a camera, a microphone, a keyboard or other buttons or keys, and/or other types of input devices for sending information to processor 130. Display 134 may be a type of input device, as display 134 may include touch-screen sensor capable of sending information to processor 130. Output devices 138 may include speakers, indicator lights, or other output devices capable of receiving signals from processor 130 and providing output from server 102. Display 134 may be a type of output device, as display 134 may provide images or other visual display of information received from the processor 130.

Server 102 may identify relationships between various inputs 104, 106, 108, and 110, and associate them. Other data may be associated with the identified relationships. For example, relationships between buildings and properties may be identified and associated along with other data such as, for example, elevation and geographic areas that the Federal Emergency Management Agency (FEMA) has defined according to varying levels of flood risk (referred to as FEMA zones).

Server 102 may determine various parameter quantities pertaining to the type of hazard. For example, for a type of hazard of flooding, a parameter pertaining to flooding may be depth, and the quantity may the depth value. For example, the depth of flooding at building footprints and parcel centroids may be extracted from each hazard layer. Several depths at various combinations of: annual probability (50%, 20%, 5%, 1%, 0.4%, 0.2%); year (current year, 15 years from now, 30 years from now); and climate scenario (representing low, mid and high of the climate uncertainty bands) may be determined.

Server 102 may generate probabilistic relationships of a hazard type in a given time period. For example, server 102 may generate probabilistic relationships of flooding in a given year. Using statistical methods, in an example embodiment, server 102 may generate a statistical relationship of depth as a function of probability. The relationship of depth as a function of probability may be generated for any appropriate scenario. For example, the relationship of depth as a function of probability may be generated in both a current year median climate scenario and a 30-year median climate scenario. This relationship allows identification of likely flooding depths at any probability within those two years. Depth as a function of probability, time period, and climate may be determined for multiple locations, or properties. For example, depth as a function of probability, time period, and climate may be determined for every property in a region (e.g., the US). In an example embodiment, specific depths, such as an inundation depths may be determined for specific properties as a function of probability, time period, and climate. As described above, this determinations may be based on the data provide by inputs 104, 106, 108, 110.

The vulnerability to a building resulting from a fire hazard, such as wildfire, may be assessed by considering the materials used in its construction, including roof type, window configuration, roof vent composition, landscape gradient. and the presence of vegetation within a certain distance of the building. The impact of wildfire on the building may be caused by direct ignition from the flames adjacent to the building, or by flying embers landing on the building or being swept inside roof vents or windows. To compute the probable loss from wildfire hazard, computation portion 120 may assess the intersection of multiple dimensions of that hazard, including probability of fire, intensity of fire, and likely ember spread, with each US property's real estate and building characteristics, including building composition, amount of cleared land or defensible space around structures, distance to adjacent buildings, and topography. The product of probable hazard with the property and building vulnerability is the probabilistic risk. This risk may be computed given current climate conditions, vegetation locations, fuel state, and fire weather conditions. Risk may be forecast for future climate conditions, predicted vegetation locations, predicted fuel states, and predicted fire weather conditions, where these predictions are based upon the results of community climate models. Impacts, including building damage, property losses, and community economic losses may be computed based on the likelihood of occurrence, type of structures, types of vegetation present on the property, and community composition (utilities, infrastructure, roads). Economic models may be applied to the probable impact determination that allow computation of an average annual loss (AAL) for each property As described herein a future risk of a hazard, such as a flood hazard for example, may take into account changing environmental factors including sea level rise, increasing cyclonic intensity, higher probabilities of cyclone landfall locations at higher latitudes, shifting precipitation patterns, and shifts in river discharge. As such, the system may determine probability distribution functions created from a blending of observed, synthetic, and forecasted inputs. Future risk determinations may rely upon recommendations related to changing environmental conditions. This information may be integrated along with an ensemble of global climate models in order to estimate expected flood risk, while allowing uncertainty around factors associated with those estimates.

As described herein historic data may be utilized to determine risk of a hazard, such as a flood hazard for example. Past flooding events may be recreated through a catalog of data sources related to actual historic observations in spatial and temporal alignment with the peak impacts of the specific events. These may include local stream/river gauge information for the simulation of historical fluvial inland flooding events and documented historic storm characteristics along the coast to model extents and depths associated with storm surge from hurricanes, tropical cyclones, and extratropical cyclones. In some cases, these events overlap and will include both storm surge and fluvial outputs for coupling related to the unique nature of the flooding event.

Adaption measures may be utilized to determine risk of a hazard. Adaption measures may include various types of measures. Adaptation measures may include, for example, acquisition, beach nourishment, bioswale, buy-out, coral reef, culvert, dam, detention basin, ditch, dune, dike, earthen berm, elevated roads, flood wall, floodplain restoration, infiltration basin, levee, living breakwater, living shoreline, mangrove, marsh/wetland restoration, open space preserve, oyster reef, pervious pavement, pipe, pump, deployable, pump station, rain garden, retention pond, seawall, sediment accretion, stormwater system upgrade, spillway, stormwater vault, tide gate, valve, weir, or the like, or any appropriate combination thereof.

Acquisition may include acquisition of a property in a floodway that is intended to reduce the risk of future flooding. Beach nourishment may include the process of adding sediment to a beach to provide a buffer to coastal erosion as part of a coastal defense scheme. Bioswale may include channels designed to convey stormwater runoff. Buy-out may include acquisition of a property in a floodway that is intended to reduce the risk of future flooding. Coral reef may include reef structures that protect the shoreline from wave action. Culvert may include a structure that allows water to flow from one side to another, like in the case of a road. Dam may include a barrier constructed to hold back water. Detention basin may include an area meant to store water to protect against flooding for a limited period of time. Ditch may include a narrow channel used for drainage. Dune may include a mound of sand or sediment that can act as a barrier to flooding. Dike may include a wall or embankment that works to prevent flooding. Earthen berm may include a ledge made of soil that can prevent flooding. Elevated roads may include a road raised specifically to prevent flooding. Flood wall may include a wall that protects from flooding. Floodplain restoration may include the process of restoring a river's floodplain. Infiltration basin may include a vegetated area where stormwater runoff is stored and then infiltrated into the soil. Levee may include an embankment built to prevent flooding from a river. Living breakwater may include an offshore structure designed as a barrier to limit wave energy. Living shoreline may include a shoreline stabilization technique that uses vegetation and can slow down wave action. Mangrove may include a species of tree with an extensive root system that slows down wave action. Marsh/wetland creation may include construction of a marsh or wetland on a site that never was before. A place for water to be stored, therefore reducing flooding inland of it. Marsh/wetland restoration may include restoration of a marsh or wetland. A place for water to be stored, therefore reducing flooding inland of it. Open space preserve may include an area of protected or conserved land. Oyster reef may include an oyster habitat that can reduce wave momentum by increasing friction at the bed and/or surface. Pervious pavement may include porous concrete that allows rainwater to pass through it, reducing runoff which exacerbates local flooding. Pipe may include a structure that moves water from one place to the next. Pump, deployable may include a mobile structure that moves away large volumes of water. Pump station may include a permanent structure that moves away large volumes of water. Rain garden may include an area that collects rainwater from a road, driveway, or street and allows time for water to soak into the ground or be carried away. Retention pond may include an area designed with additional storage capacity to hold surface water runoff during rainfall events. Seawall may include a coastal defense structure that mitigates flooding by protecting for the action of the tides and waves. Sediment accretion may include coastal sediment returning to the visible portion of a beach or shoreline. Stormwater system upgrade may include an update to an existing system that better handles flood water during rain events. Spillway may include a structure used to provide controlled release of water from a dam or levee. Stormwater vault may include an underground structure designed to manage excess stormwater runoff. Tide gate may include an opening where the tide can move freely in one direction but then closes automatically or manually to prevent water from flowing in the other direction. Valve, also known as a backflow preventer, may have an automatic mechanism that prevents water from flowing up from the water source through a stormwater pipe and onto the street once the pipe is at capacity. Weir may include a small dam built on a river to regulate the level of water or flow.

Figure 3:
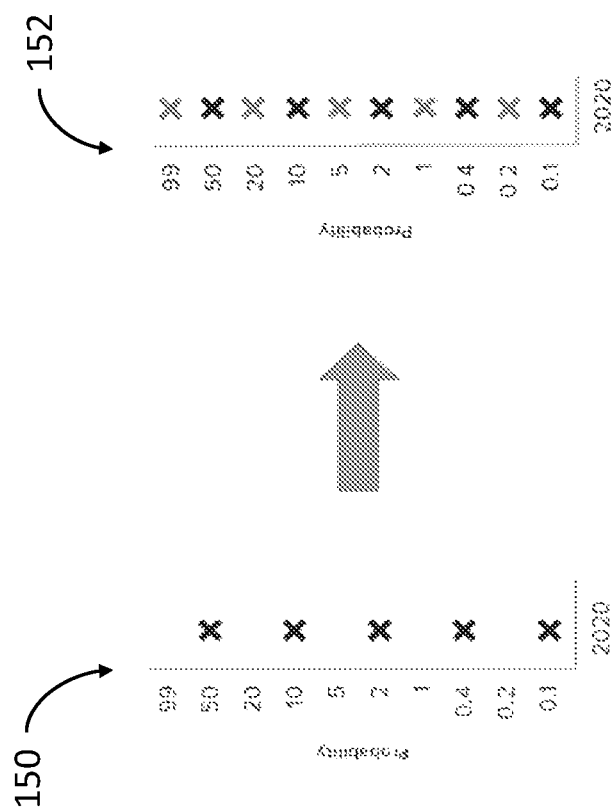
FIG. 3 depicts an interpolation process across return periods.

FIG. 3 depicts an interpolation process across return periods. FIG. 3 depicts graphs 150, 152, each illustrating depth as a function of probability for the year 2020. To provide a better understanding of the information depicted in graphs 150, 152, a brief description of the relationship between probability and return period is provided. As described above, a return period is the estimated time interval between similar events. For example, if the return period of a flood is 100 years, meaning that the flood may occur once every 100 years, the probability that the flood will occur is 1 in 100, or 1%. Thus, return period is inverse of probability.

Once depth as a function of probability, time period, and climate is determined as described above based on data provided via inputs 104, 106, 108, 110, interpolation may be employed to determine depth as a function of probability for additional combinations of probability, year, and climate scenario. This may be determined for a specific terrestrial boundary or property. Graph 150 in FIG. 3 depicts depth as a function of probability for the year 2020. Each "X" represents a specific depth. Each blue (lighted shaded) "X" represents modeled depth data, and each black (darker shaded) "X" represents interpolated depth data. Each "X" may represent a specific depth for a specific property, based on a specific climate scenario. For example, each "X" may represent an inundation depth at a specific property. As shown in graph 150, depths were determined for probabilities of 0.1, 0.4, 2, 10, and 50. Interpolation may be used to determine depths at the remaining probabilities, as depicted in graph 152. Any appropriate interpolation technique may be employed. For example, a non-linear regression technique may be used. Thus, statistical methods may be used to quantify flood risks and depths in scenarios that were not explicitly modeled. Interpolation may be used to reduce processing needed to process values of each of the hazard layers at each time and space and to prevent losses of data above a threshold.

Figure 4:
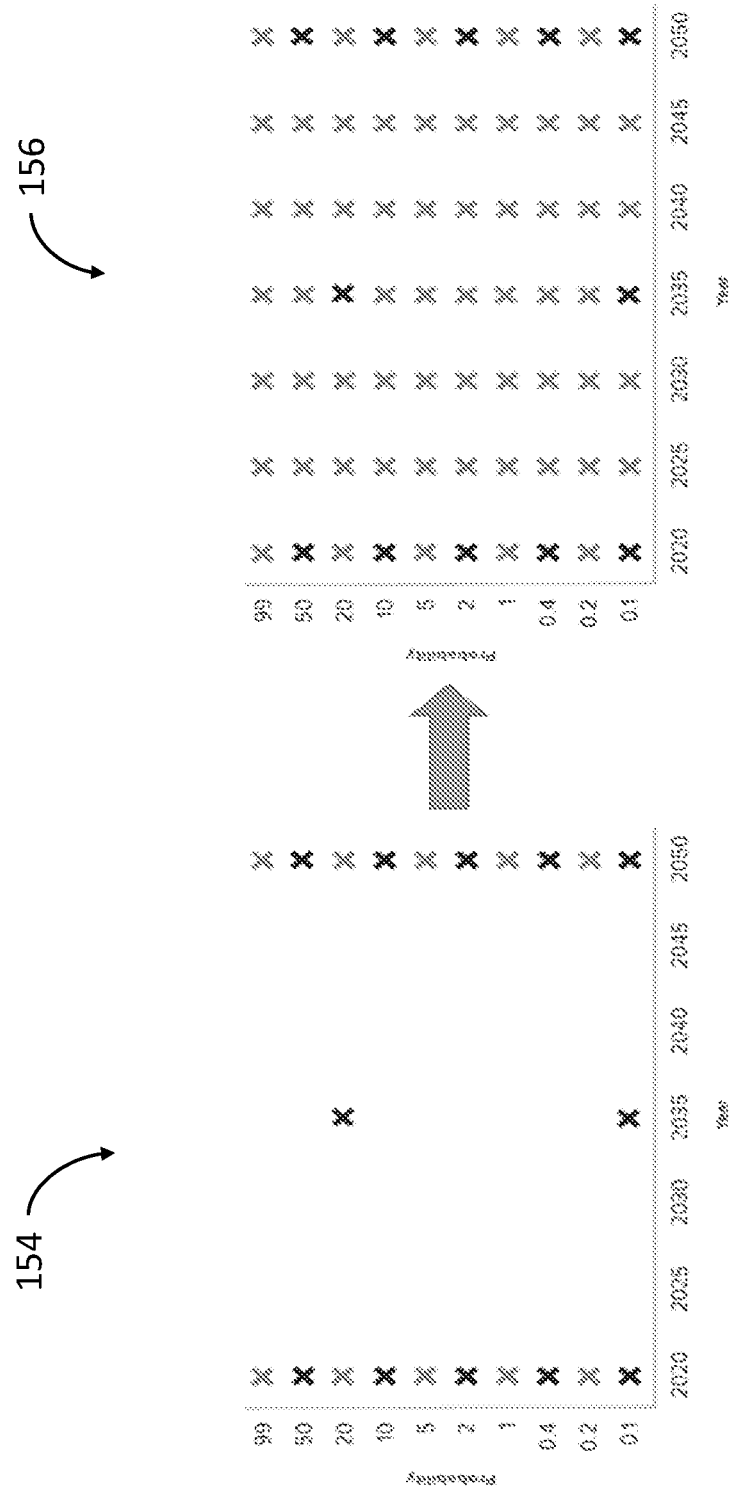
FIG. 4 depicts an interpolation process across future hazards.

FIG. 4 depicts an interpolation process across future hazards. Each blue (lighted shaded) "X" represents modeled depth data, and each black (darker shaded) "X" represents interpolated depth data. Graph 154 illustrates modeled and interpolated depth data as a function of time (e.g., for the years 2020 and 2050), and modeled depth data as a function of time (e.g., for the year 2035). The depth data were calculated as describe above. For example, a non-linear regression technique may be used to determine the depth of flooding at various return periods of flooding in the years 2020 and 2050, as depicted in graph 154. This relationship was validated by explicitly modeling these return period hazard layers and recreating certain return periods that were not shown to the regression model. This proved to be quite accurate, especially in developed areas where buildings were located. This then allows for creation of a predicted depth of flooding at any point in the United States for any likelihood of flooding. Once the relationship of depth and probability are charted out for the years 2020, 2035, and 2050, as depicted in graph 154, linear interpolation may be employed to estimate depth of flooding at any return period as a function of time, e.g., for any 5-year increment between 2020 and 2050, as depicted in graph 156.

Figure 5:
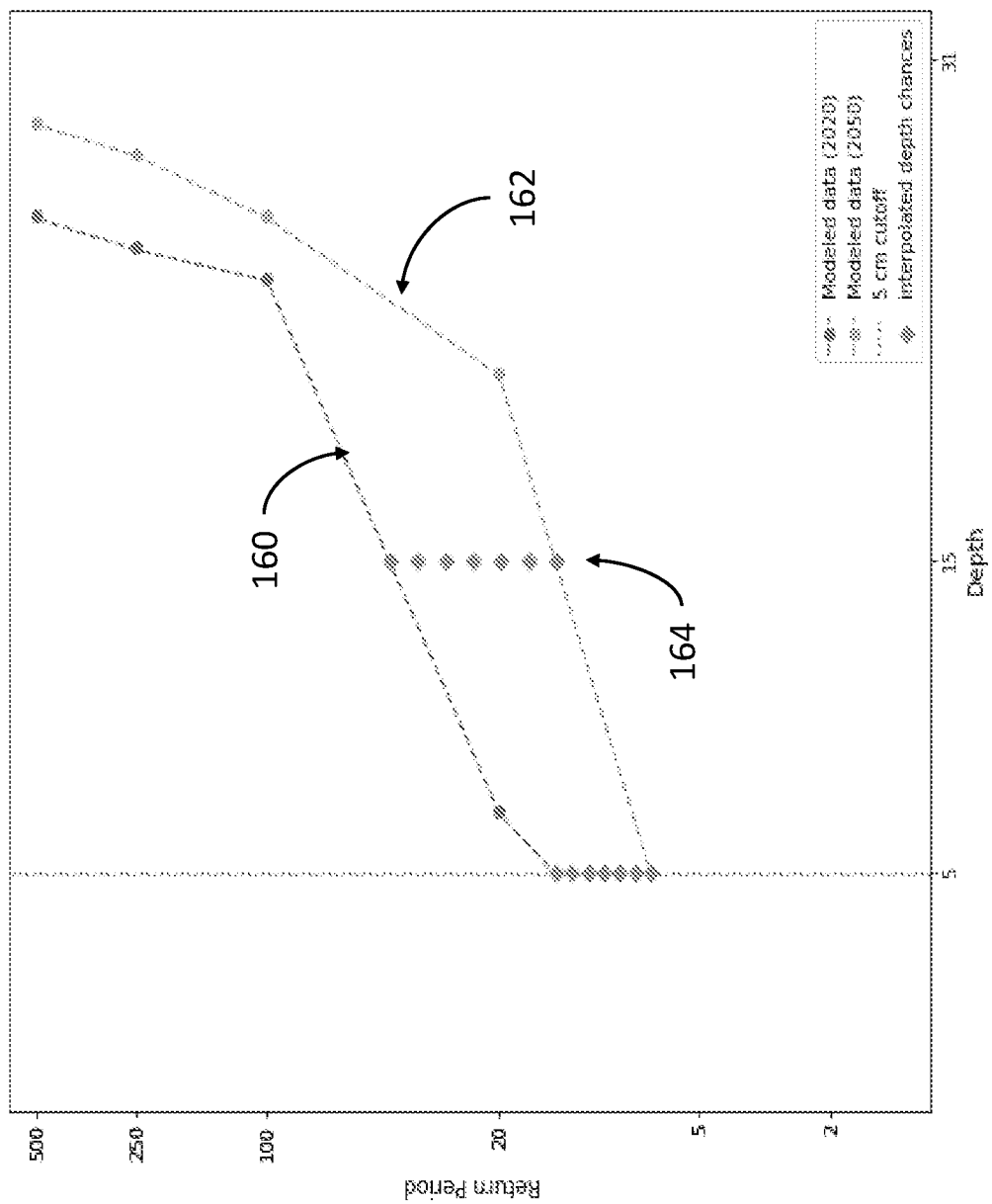
FIG. 5 depicts the chance of flooding to a particular depth vs return period per year.

FIG. 5 depicts the chance of flooding to a particular depth in centimeters vs return period per year. Using the relationship between depth and probability described above, the system may determine the likelihood of flooding at several different depth thresholds, as depicted in FIG. 5. For example, the likelihood of experiencing any flooding to a building footprint, terrestrial boundary, municipal boundary, or the like may be provided. Additionally, the likelihood of experiencing specific depths of flooding to a building footprint, terrestrial boundary, municipal boundary, or the like may be provided. This may be determined for given years and interpolated across years to determine the probability of flooding to a given depth as a function of time, e.g., in any year. Curve 160 depicts depth data vs return period for the year 2020. Curve 162 depicts depth data vs return period for the year 2050. The data from curves 160, 162 may be interpolated to provide the chance (likelihood) of flooding at a particular depth for intermediate years, as depicted by points 164.

FIG. 6 depicts cumulative probabilities of flooding as a function of time, e.g., in 5-year increments. The system may determine the cumulative likelihood of a hazard for future time periods. For example, using standard probability equations, the system may identify the likelihood of flooding to each of various depths (e.g., 0, 6, 12 inches) in the current day and those in future years to calculate what the cumulative likelihood of flooding at least once over five-year periods from now until 30 years from now, as depicted in FIG. 6.

The system may determine a flood factor (also referred to a risk score). The flood factor represents an assessment of the likelihood of flooding and the severity of flooding. For example, the flood factor may be a single metric that encapsulates the risk for an individual property, terrestrial boundary, municipal boundary, or the like. The flood factor is a metric that is based on the cumulative likelihood of flooding to various depths as described above. The flood factor represents a distillation of the above-described data and processing. In an example embodiment, the flood factor is a number between 1 and 10 that represents the likelihood of flooding and the severity of flooding. The flood factor may be assigned based on the likelihood of flooding at various depth thresholds. The flood factor may increase as the probability increases or as the depth increases. Each property may receive a flood factor (risk rating) for several different depths. In an example embodiment, the most common of these several flood factors is selected as the overall flood factor for a given property, terrestrial boundary, municipal boundary, or the like.

The system may determine the annualized expectation of financial losses to a property, terrestrial boundary, municipal boundary, or the like. For example, the system may determine an average annual loss (referred to as AAL) that represents the expected annualized damage to property, terrestrial boundary, municipal boundary, or the like, given the flood depths calculated at various return periods as a function of time, e.g., in each year. This also may be provided a cumulative quantity to show what the expected financial losses would be over a period of time for various flooding scenarios. Financial losses may be provided in US dollars. The system may provide the number of properties, terrestrial boundaries, municipal boundaries, or the like with any loss and average dollar value loss broken down by the flood factor score.

The system may provide the financial loss due to flood risk for property, terrestrial boundary, municipal boundary, or the like, by depth. The dollar loss may be provided along with the associated depth. Losses may be determined in an appropriate manner. For example, losses may be determined by using the U.S. Army Corps of Engineers depth damage functions for Riverine and Surge flooding. Losses also may be determined based on expected precipitation flooding.

The system may determine annual loss in US dollars due to flood risk as a for a property, terrestrial boundary, municipal boundary, or the like by in multiple-year increments. The system may determine the count and dollar loss for properties, terrestrial boundaries, municipal boundaries, or the like with loss in the respective location along with associated year and flood factor score. The system may determine total financial loss or total count for all properties, terrestrial boundaries, municipal boundaries, or the like, with the associated flood factor level of risk in the respective location.

Figure 7:
FIG. 7 is a mapping depicting flood risk to a municipality.

FIG. 7 is a map depicting flood risk to a municipality. As shown in FIG. 7, the darker areas (blue) indicate the forecasted 1 percent (1 in 100) annual flood risk for a city.

Figure 8:
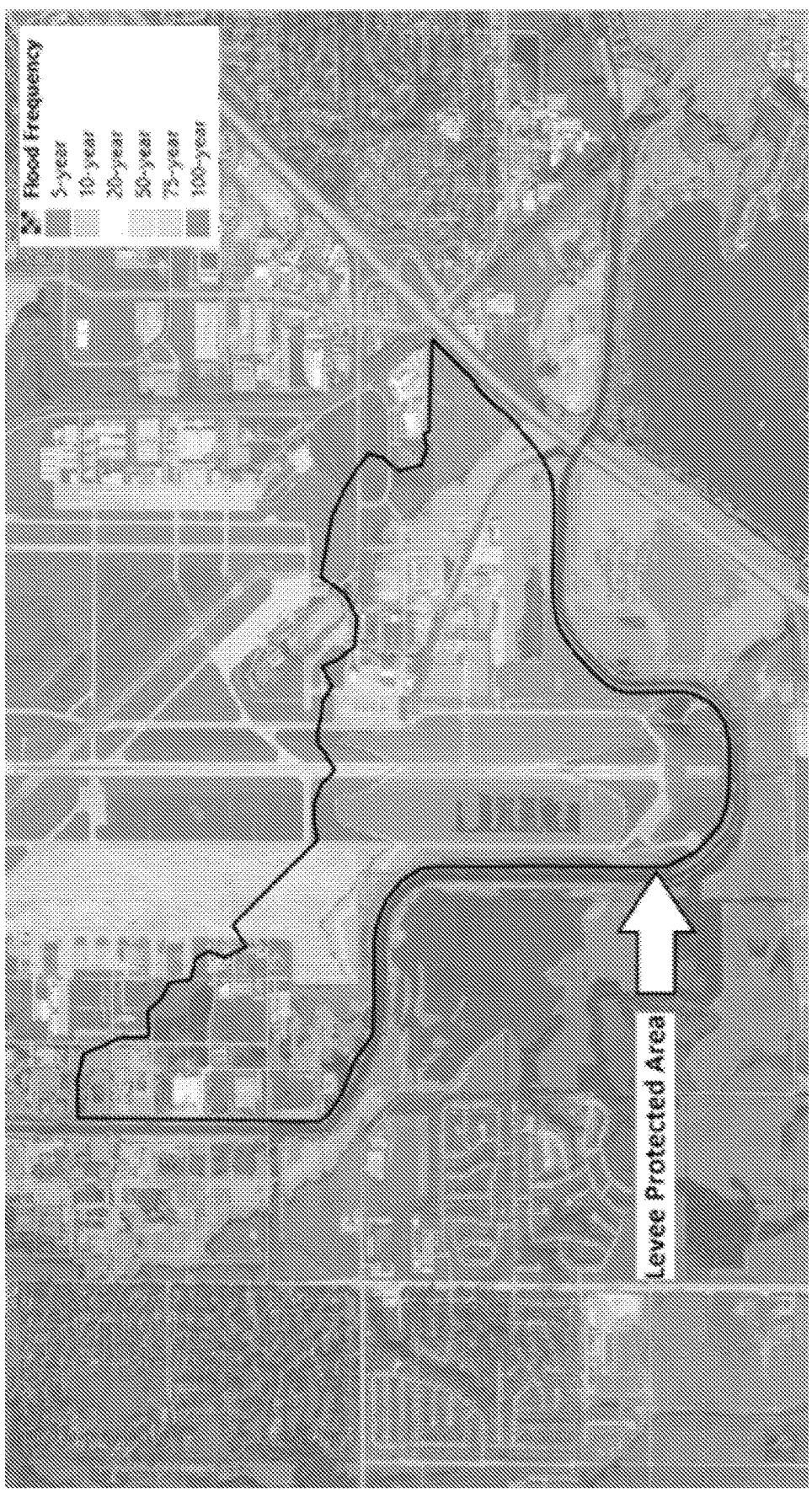
FIG. 8 depicts a mapping of flood extents by return period.

FIG. 8 depicts a mapping of flood extents by return period. The key in the upper right corner of the map indicates various color-coded return periods. The area outlined in black, and labeled Levee Protected Area, is an area that is expected to be protected by a levee. It has an expected rating for a 50-year flood (i.e., 50-year return period). Based on the forecasts and determinations of flood-related data as described herein, and as depicted in the map of FIG. 8, the system forecasted inundation within the service area at return periods as low as the 5-year.

FIG. 9 is a functional block diagram of a specific example implementation of the system. FIG. 9 depicts a specific data operations and workflow implementation of the system. It is to be understood that implementation of the system is not limited thereto. Any appropriate data operations and workflow implementation may be utilized. In this specific implementation, functional block 170 includes Amazon Web Services (AWS) batch parallelized raster processing utilizing Python with spatial and statistical packages. Functional block 172 represent storage. In this specific implementation, hazard layers are stored in Simple Storage Service (S3) buckets (functional block 172). This is where data is stored. In essence, it functions as a data warehouse. In this specific implementation, hazard layers are processed using code we have written primarily in Python with various open source spatial and statistical packages (functional block 170). Preprocessing is performed in a parallelized batch environment provided by AWS, enabling the system to perform the same operations over a thousand tiles covering the continental US (functional block 170).

In this specific implementation, building and parcel data are imported into a Postgres database hosted by AWS (functional block 176). Other parallelized batch jobs perform the data extraction from the hazard layers, retrieving the flood depth at a given point for each building and each parcel. This data is then imported back into the database (functional block 172) and stored for future calculations.

Once all of the flood depths are stored for each property, all of the derivative statistics such as the depth chance, cumulative, and average annual loss statistics described above are calculated either within the database itself or in parallelized batch jobs as previously described, based on the needs of the calculations. Once this data is complete and verified for accuracy, it is transferred to a staging and ultimately a production database (functional block 178).

Although this specific implementation has been described for flood hazards, it is equally applicable to processing other types of hazards such as, for example, fire, storms, or the like.

FIG. 10 is a flow diagram for an example method forecasting and assessing hazard-resultant effects as described herein. One or more portions of the flow diagram shown in FIG. 10 may be implemented by the system 100 shown in FIG. 1 and/or one or more modeling servers 102. At step 180, inputs are received. Inputs received at step 180 may include inputs as described herein with respect to FIG. 1 and FIG. 2. Inputs received at step 180 may include hazard layer data, such as hazard layer data 104 described herein, for example. In an example embodiment, hazard layer data received at step 180 may include flood hazard layers, which may be the result of various hydrodynamic flood models, or the like, that indicate a probability of flood at a snapshot in time and space for a given area. Flood hazard layers received at step 180 may be in the form of raster representations of the annual likelihood of a certain type of flooding in a specific combination of year and climate scenario. Flood hazard layers data received at step 180 may be encoded with a depth of flooding (e.g., metric or standard, centimeters, inches, feet, fathoms, etc.). For example, each flood hazard layer of hazard layer may represent the depth and extent of flooding in a scenario such as a 1% annual flood event in the year 2020, under median climate conditions. Various other parameters may be received at step 180, such as elevation data, stream gauge readings, tide gauge readings, rainfall intensity data, or the like. Similar to flood hazard data, other type of hazard data may be received at step 180, such as, for example, flood, fire/wildfire (smoke, air quality), heat (air quality), drought, connective storms (e.g., tornado, hail), severe thunderstorms, mudslides landslides, climate-related hazards, or the like.

Inputs received at step 180 may include property and parcel data, such as property and parcel data 106, as described herein, for example. Property and parcel data received at step 180 may include various types of terrestrial and property boundaries. For example, property and parcel data received at step 180 may include survey meets and bounds of a representation of terrestrial boundaries, personal property boundaries, addresses, building characteristics, sales records, or the like.

Inputs received at step 180 may include building footprint data, such as building footprint data 108, as described herein. Building footprint data received at step 180 may 108 may include outlines of buildings. The outlines may be obtained from any appropriate source, for example, satellite imagery, maps, or the like.

Inputs received at step 180 may include miscellaneous data, such as miscellaneous data 110, as described herein. Miscellaneous data received at step 180 may include census geography data. Census geography data received at step 180 may include census data for a given terrestrial boundary, municipal boundary, building, or the like. The miscellaneous data may include inputs from the user for a period of time, a property value, or a given hazard (e.g., flood, fire, etc.) for which the probability of risk is to be calculated.

At step 182, parameter quantities pertaining to a hazard type may be forecast, as described herein. For example, for a type of hazard of flooding, a parameter pertaining to flooding may be depth, and the quantity may the depth value indicated or calculated from the values for the property in the hazard for the given time period. In an example embodiment, the depth of flooding at building footprints and/or parcel centroids may be extracted from hazard layer data received at step 180 for the period of time. Several depths at various combinations of: annual probability (50%, 20%, 5%, 1%, 0.4%, 0.2%); year (current year, 15 years from now, 30 years from now); and climate scenario (representing low, mid and high of the climate uncertainty bands) may be extracted from the hazard layers to identify the probabilities in various spaces and times for the given hazard. Though depth of water is provided as a value for a flooding hazard, other similar hazard values may be forecast using the hazard layers over time. The quantities of the hazard layers may be interpolated to reduce the number of hazard layer values for a given location that need to be calculated, while preventing loss of data over a threshold.

At step 184, a probability of occurrence for the parameter quantities may be forecast, as described herein. For example, for a hazard type of flooding, probabilistic relationships of flooding in a given year may be determined. The forecasted hazard values determined in step 182 that are indicated in the hazard map for the given location may be aggregated over a period of time to create a probability of occurrence. The probability of occurrence may be calculated based on the severity (e.g., severity 112), the chance (e.g., chance 114), and/or the cumulative data 116 over the period of time. Non-linear interpolation may be implemented to create intermediate years between values of hazard layers through computer simulation. This may avoid expensive processing without a loss of data over a threshold for processing each year of data.

Using statistical methods, in an example embodiment, a statistical relationship of depth as a function of probability may be generated. The relationship of depth as a function of probability may be generated for any appropriate scenario. For example, the relationship of depth as a function of probability may be generated in both a current year median climate scenario and a 30-year median climate scenario based on the values indicated in the hazard layers. Depth as a function of probability, time period, and climate may be determined for multiple locations, or properties. For example, depth as a function of probability, time period, and climate may be determined for every property in a region (e.g., the US). In an example embodiment, specific depths, such as an inundation depths may be determined for specific properties as a function of probability, time period, and climate.

At step 186, risk may be forecast, as described herein. A risk score may be calculated as a combination of a severity level (e.g., indicated by the severity data 112) for the property and probability of occurance (e.g., indicated by the chance data 114). In an example, the risk score may be calculated as the severity level indicated in severity data multiplied by the chance of occurrence over the indicated time.

For an example hazard type of flooding, a flood factor (also referred to a risk score) may be determined. The flood factor represents an assessment of the likelihood of flooding and the severity of flooding. For example, the flood factor may be a single metric that encapsulates the risk for an individual property, terrestrial boundary, municipal boundary, or the like. The flood factor is a metric that is based on the cumulative likelihood of flooding to various depths as described above. The flood factor represents a distillation of the above-described data and processing. In an example embodiment, the flood factor is a number between 1 and 10 that represents the likelihood of flooding and the severity of flooding. The flood factor may be assigned based on the likelihood of flooding at various depth thresholds. The flood factor may increase as the probability increases or as the depth increases. Each property may receive a flood factor (risk rating) for several different depths. In an example embodiment, the most common of these several flood factors is selected as the overall flood factor for a given property, terrestrial boundary, municipal boundary, or the like.

At step 188, loss may be forecast, as described herein. For a hazard type of flooding, the annualized expectation of financial losses to a property, terrestrial boundary, municipal boundary, or the like, may be determined. For example, an average annual loss that represents the expected annualized damage to property, terrestrial boundary, municipal boundary, or the like, given the flood depths calculated at various return periods in each year, may be determined. A cumulative quantity to show what the expected financial losses would be over a period of time for various flooding scenarios may be determined. Financial losses may be provided in US dollars. The number of properties, terrestrial boundaries, municipal boundaries, or the like with any loss and average dollar value loss broken down by the flood factor score may be provided Results may be provided at step 190. A user of the system may be able to obtain results pertaining to any of the determination and forecast describe herein. For example, a user may be able to obtain results regarding the type of hazard, the parameter quantities, the probability of occurrence of parameter quantities, risk, loss, or any combination thereof.

Results pertaining to depth data may be provided at step 190, as described herein. For example, results pertaining to severity data 112 may be provided. At step 190, results pertaining to depth data may include the flood depth for flooding to a property, terrestrial boundary, municipal boundary, or the like, broken down by return period and year, as described above. Depth data may include values for each of various (e.g., low, mid, and high) climate scenarios.

At step 190, results pertaining to chance data may be provided. For example, results pertaining to chance data 114 may be provided. At step 190, results pertaining to chance data may include the risk likelihood (e.g., percent probability) for flooding to a property, terrestrial boundary, municipal boundary, or the like, broken down by depth threshold and year of annual risk as described above. Chance data may include values for each of the low, mid, and high climate scenarios.

At step 190, results pertaining to cumulative data may be provided. 116. For example, results pertaining to cumulative data 116 may be provided. At step 190, results pertaining to cumulative data may include the risk likelihood (e.g., percent probability) for flooding to a property, terrestrial boundary, municipal boundary, or the like, broken down by depth threshold and cumulative year as described above. Cumulative data may include values for each of the low, mid, and high climate scenarios.

At step 190, results pertaining to loss, health, quality of life, or the like, may be provided, as described herein. For example, results pertaining to output data 118 may be provided, which may include, for example, the Average Annual Loss (AAL) due to modeled hazard (flood, fire, wind, smoke, air quality heat, drought, convective storm, e.g., tornado, hail, severe thunderstorms, mudslide, landslide) risk for a location, the impact on health due to modeled hazard risk for a location, the impact on a quality of life due to modeled hazard risk for a location, or the like.

The system may comprise an application programming interface (API) that allows a user to provide various inputs and receive various outputs regarding hazards. For example, the API may include a location API that provides access any property's risk summary and how risks may evolve over time due to environmental changes. The API may include an economic API that provides estimate flood losses under different climate conditions to assess a location's financial risk from flooding. The API may include a historic API that provides insight into the likelihood of a location's past flooding with over 100 historic floods modeled, mapped and analyzed. The API may include a probability API that provides annual or cumulative risk for any property for 8 return periods over the next 30 years. The API may include an adaptation API that provides local adaptation measures, like seawalls and levees, serve the location and to what extent. The API may include an environmental API that provides information about how changing weather patterns and higher seas contribute to greater risks in the future. The API may include a FEMA API that provides National Flood Insurance Program (NFIP) claims data from FEMA including the number of policies, number of claims, amount of coverage, and amount paid on claims. The API may include a tiles AP that incorporate hazard layers into external maps or overlay for analysis visually showing extents of past, present or future risk.

A user may provide requests to the API for particular types of information. The API may provide responses indicate success of failure of a particular request. For example, the API may provide a response of success indicating a successful API request. The API may provide an unauthorized request indicating that the request is unauthorized. The API may provide a forbidden response indicating that the request if forbidden. The API may provide a not found response indicating that the requested item was not found. The API may provide a bad request response indicating that the specific query parameters are missing for a request. The API may provide a too many requests response indicating too many request have been mode with a given amount of time (e.g., greater 150 requests per minute). The API may provide an internal server error indicating that there is a problem with a server implementing the API. The API may provide a not implemented response indicating that data regarding a particular response has not been implement.

The API may provide searching by the use of location (referred to as location lookups). A location lookup may include an address, a particular identifier (referred to as an FSID), or a by coordinates. The API may provide depth data as described herein. The API may provide flood depth for flooding to a building footprint broken down by return period and year of annual risk. The API may provide chance data as described herein. Chance data may include the risk likelihood (percent probability) for flooding to a building footprint broken down by depth threshold and year of annual risk. The API may provide cumulative data as described herein. Cumulative data may include the risk likelihood (percent probability) for flooding to the building footprint broken down by depth threshold and cumulative year. The API may provide count data as describe herein. Count data may include the total count of properties with flood risk within a location broken down by depth threshold, return period, and year. The API may provide average annual loss (AAL) data as described herein. The API may provide historic information. Historic information may include information regarding all events that impacted a location including event name, type or cause, date, and the level of impact, flood depth to the building footprint on the property, or count of properties for other location types. The API may provide information pertaining to adaptation measures, as describe herein. The API may provide precipitation data. Precipitation data may include future projections for specific time frames (e.g., years 2020, 2035 and 2050), from the average change in extreme precipitation event intensity using historical data for the county. The API may provide sea level data. Sea level data may include tide station name and IDs for all tide station associated with a state. The API may provide tide station data. Tide station data may include tide station metadata as well as the annual observed mean sea level rise (e.g., for the years 1980-2020), and seal level rise projection by multiple-year (e.g., 10-year) increments (e.g., ranging from the years 2020-2050) for a tide station.

The API may include a tiles API that provides the ability to customize maps by layering flood tiles on a map. The tiles API may facilitate the visualization the flood risk. Tiles may be applied to a user's maps to create visualizations of various risk types. Tile layers may be placed over the top of a user's map at a specific zoom level. Multiple zoom levels of flood risk may be provided. The API may provide a map tile that represents flood inundation with multiple depth thresholds for a specified return period as a function of time, e.g., year. The API may provide a map tile that represents flood inundation with multiple thresholds form a historic event.

While example embodiments of systems and methods for forecasting and assessing hazard-resultant effects have been described in connection with various computing devices/processors/servers, the underlying concepts can be applied to any computing device, processor, server, or system capable of forecasting and assessing hazard-resultant effects as described herein. The methods and apparatuses for forecasting and assessing hazard-resultant effects, or certain aspects or portions thereof, can take the form of program code (i.e., instructions) embodied in tangible storage media having a concrete physical structure, such as floppy diskettes, CD-ROMs, hard drives, or any other machine-readable storage medium having a concrete physical tangible structure, wherein, when the program code is loaded into and executed by a machine, such as a computer, server, or the like, the machine becomes an apparatus for forecasting and assessing hazard-resultant effects. A computer-readable storage medium, also referred to herein as a computer storage medium, as described herein is an article of manufacture, and thus, not to be construed as a transitory signal. In the case of program code executable on programmable computers, the computing device will generally include a processor, a storage medium readable by the processor (including volatile and non-volatile memory and/or storage elements), at least one input device, and at least one output device. The program(s) can be implemented in assembly or machine language, or the like. The language can be a compiled or interpreted language, and combined with hardware implementations.

The methods and apparatuses for forecasting and assessing hazard-resultant effects can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for forecasting and assessing hazard-resultant effects. When implemented on a general-purpose processor, the program code combines with the processor to provide a unique apparatus that operates to invoke the functionality of forecasting and assessing hazard-resultant effects.

Aspects of the present invention have been described in detail with reference to illustrated embodiments. Those skilled in the art, however, will appreciate that modifications may be made thereto without departing from the scope of the invention. Moreover, the present invention is not limited to the precise construction and compositions disclosed herein. Any and all modifications, changes, and variations apparent from this disclosure are within the scope of the invention as defined by the appended claims. Additionally, the present invention expressly includes any and all combinations of the preceding elements, features, and embodiments.

What is claimed is:

1. A system comprising:
an input interface configured to receive:
hazard data based on a hazard that has not yet occurred; and
geographic data;
a computation portion configured to:
forecast, based at least in part on the hazard data and the geographic data, a likelihood that a hazard will occur as a function of time at a specific location, based on an aggregate of at least two characteristics related to a number of entities within the specific location and a relative proximity to entities within or outside of the specific location, wherein:
the function of time comprises a time period starting at a current time and covering a plurality of years;
a specific location comprises at least one of a terrestrial boundary, a real-property boundary, a census geography, a municipal boundary, a geographic area, or a geographic point;
a characteristic of the at least two characteristics related to an entity comprises at least one of a building characteristic, building composition, or vegetation; and
an output interface configured to provide an indication of the forecasted likelihood that the hazard will occur as a function of time at the specific location.

2. The system of claim 1, wherein:
the computation portion is further configured to forecast, based at least in part on the hazard data and the geographic data, a severity of the hazard as a function of time at the specific location; and
the output interface is further configured to provide an indication of the severity of the hazard as a function of time at the specific location.

3. The system of claim 1, wherein a characteristic of the at least two characteristics related to an entity further comprises at least one of an amount of cleared land around a building, an amount of defensible space around a building, or distance to adjacent buildings.

4. The system of claim 1, wherein:
the computation portion is configured to forecast an amount of loss to an entity within the specific location as a result of the hazard; and
the output interface is configured to provide an indication of the forecasted amount of loss.

5. The system of claim 1, the computation portion further configured to forecast an impact on health as a result of the hazard.

6. The system of claim 1, wherein the hazard comprises one of flooding or drought.

7. The system of claim 1, wherein the hazard comprises fire.

8. The system of claim 7, wherein the forecasted likelihood that the hazard will occur as a function of time is determined, based at least in part, on a topography within or outside of the specific location.

9. The system of claim 7, wherein a characteristic of the at least two characteristics related to an entity comprises a fuel state of an entity within or outside of the specific location.

10. The system of claim 7, the computation portion further configured to forecast an impact on air quality at the specific location as a result of the hazard.

11. A method comprising:
forecasting a likelihood that a hazard will occur as a function of time at a specific location, based on an aggregate of at least two characteristics related to a number of entities within the specific location and a relative proximity to entities within or outside of the specific location, wherein:
the function of time comprises a time period starting at a current time and covering a plurality of years;
a specific location comprises at least one of a terrestrial boundary, a real-property boundary, a census geography, a municipal boundary, a geographic area, or a geographic point;
a characteristic of the at least two characteristics related to an entity comprises at least one of a building characteristic, building composition, or vegetation; and
providing an indication of the forecasted likelihood that the hazard will occur as a function of time at the specific location.

12. The method of claim 11 further comprising:
forecasting, based at least in part on the hazard data and the geographic data, a severity of the hazard as a function of time at the specific location; and
providing an indication of the severity of the hazard as a function of time at the specific location.

13. The method of claim 11, wherein, a characteristic of the at least two characteristics related to an entity further comprises at least one of an amount of cleared land around a building, an amount of defensible space around a building, or distance to adjacent buildings.

14. The method of claim 11, further comprising:
forecasting an amount of loss to an entity within the specific location as a result of the hazard; and
providing an indication of the forecasted amount of loss.

15. The method of claim 11, further comprising forecasting an impact on health as a result of the hazard.

16. The method of claim 11, wherein the hazard comprises one of flooding or drought.

17. The method of claim 11, wherein the hazard comprises fire.

18. The method of claim 17, further comprising forecasting the likelihood that the hazard will occur as a function of time, based at least in part, on a topography within or outside of the specific location.

19. The method of claim 17, wherein a characteristic of the at least two characteristics related to an entity comprises a fuel state of an entity within or outside of the specific location.

20. The method of claim 17, further comprising forecasting an impact on air quality at the specific location as a result of the hazard.

21. At least one computer-readable storage medium comprising executable instructions for configuring at least one processor to:
forecast a likelihood that a hazard will occur as a function of time at a specific location, based on an aggregate of at least two characteristics related to a number of entities within the specific location and a relative proximity to entities within or outside of the specific location, wherein:
the function of time comprises a time period starting at a current time and covering a plurality of years;
a specific location comprises at least one of a terrestrial boundary, a real-property boundary, a census geography, a municipal boundary, a geographic area, or a geographic point;

a characteristic of the at least two characteristics related to an entity comprises at least one of a building characteristic, building composition, or vegetation; and providing an indication of the forecasted likelihood that the hazard will occur as a function of time at the specific location or entity within the specific location.

22. The at least one computer-readable storage medium of claim 21, the executable instructions further for configuring the at least one processor to:

forecast, based at least in part on the hazard data and the geographic data, a severity of the hazard as a function of time at the specific location; and provide an indication of the hazard as a function of time at the specific location.

23. The at least one computer-readable storage medium of claim 21, wherein, a characteristic of the at least two characteristics related to an entity further comprises at least one of an amount of cleared land around a building, an amount of defensible space around a building, or distance to adjacent buildings.

24. The at least one computer-readable storage medium of claim 21, the executable instructions further for configuring the at least one processor to:

forecast an amount of loss to an entity within the specific location as a result of the hazard; and provide an indication of the forecasted amount of loss.

25. The at least one computer-readable storage medium of claim 21, the executable instructions further for configuring the at least one processor to forecast an impact on health as a result of the hazard.

26. The at least one computer-readable storage medium of claim 21, wherein the hazard comprises one of flooding or drought.

27. The at least one computer-readable storage medium of claim 21, wherein the hazard comprises fire.

28. The at least one computer-readable storage medium of claim 27, the executable instructions further for configuring the at least one processor to forecast the likelihood that the hazard will occur as a function of time, based at least in part, on a topography within or outside of the specific location.

29. The at least one computer-readable storage medium of claim 27, wherein a characteristic of the at least two characteristics related to an entity comprises a fuel state of an entity within or outside of the specific location.

30. The at least one computer-readable storage medium of claim 27, the executable instructions further for configuring the at least one processor to forecast an impact on air quality at the specific location as a result of the hazard.

* * * * *